G. A. WEBSTER.

BRAKE HANDLE.

APPLICATION FILED FEB. 10, 1916.

Reissued Mar. 21, 1916.

14,091.

2 SHEETS—SHEET 1.

Inventor:

George A. Webster

By Pennie Davis & Marvin

Attys

G. A. WEBSTER.

BRAKE HANDLE.

APPLICATION FILED FEB. 10, 1916

Reissued Mar. 21, 1916.

14,091.

2 SHEETS—SHEET 2.

Inventor:

George A. Webster

By Pennie Davis & Marvin

Attys.

UNITED STATES PATENT OFFICE.

GEORGE A. WEBSTER, OF SOMERVILLE, MASSACHUSETTS, ASSIGNOR, BY MESNE ASSIGNMENTS, TO RATCHET BRAKE COMPANY, OF NEW YORK, N. Y., A CORPORATION OF DELAWARE.

BRAKE-HANDLE.

14,091. Specification of Reissued Letters Patent. Reissued Mar. 21, 1916.

Original No. 1,105,866, dated August 4, 1914, Serial No. 818,860. Application for reissue filed February 10, 1916. Serial No. 77,539.

*To all whom it may concern:*

Be it known that I, GEORGE A. WEBSTER, a citizen of the United States, residing at Somerville, county of Middlesex, and State of Massachusetts, have invented certain new and useful Improvements in Brake-Handles; and I do hereby declare the following to be a full, clear, and exact description of the invention, such as will enable others skilled in the art to which it appertains to make and use the same.

My invention relates to an improvement in brake handles and especially to that type of handle in which coöperating clutch or ratchet members are controlled by a drop lever the advantage of which is well known to those skilled in the art.

The essential object of my invention is to provide a brake handle of relatively few parts coöperating with one another to provide a handle of superior strength and efficiency and one moreover absolutely positive in its operation.

My invention can best be seen and understood by reference to the drawings in which there is shown an embodiment thereof and in which—

Figure 1:
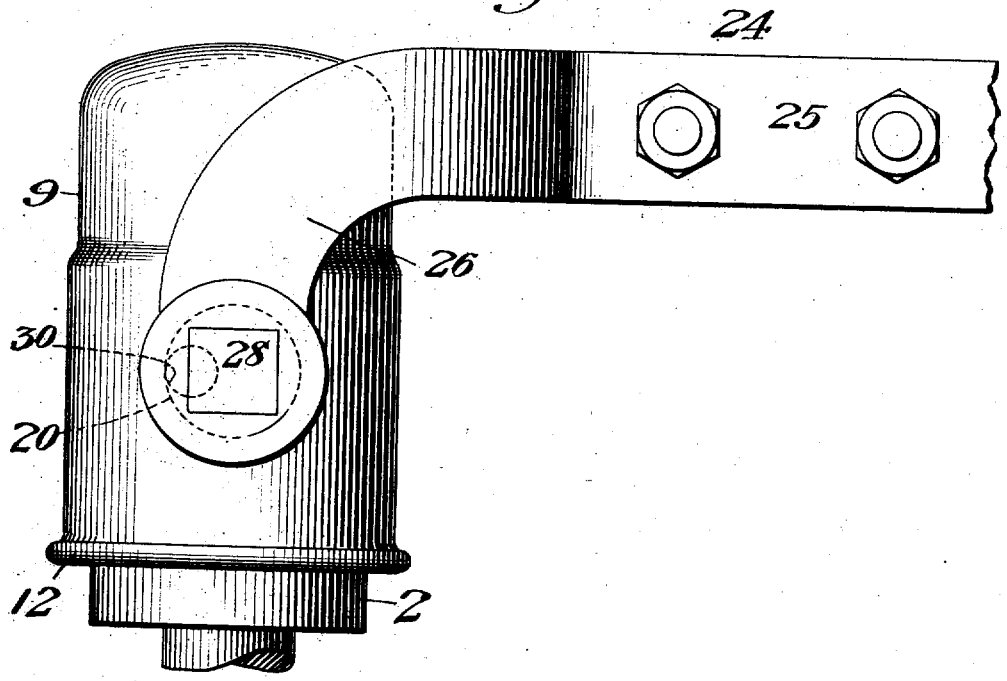
Figure 2:
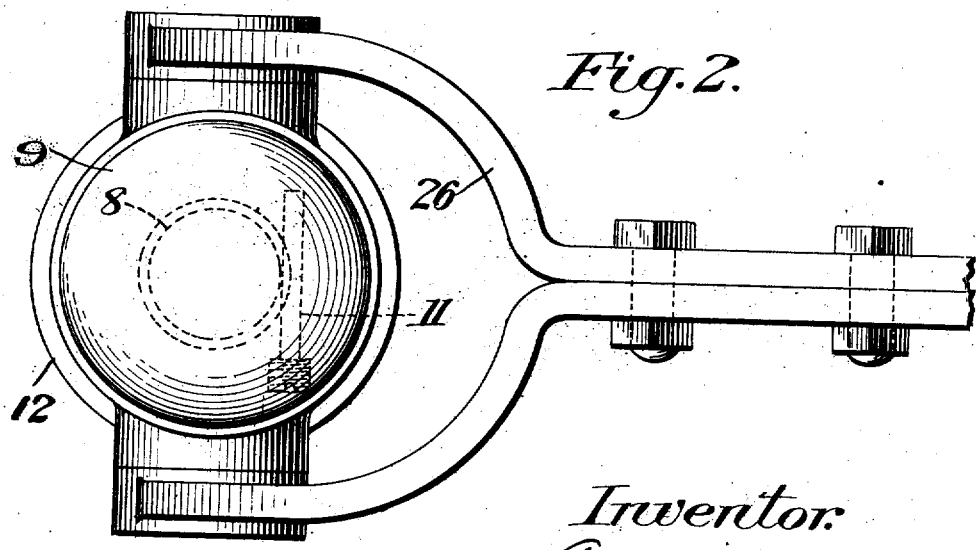
Figure 3:
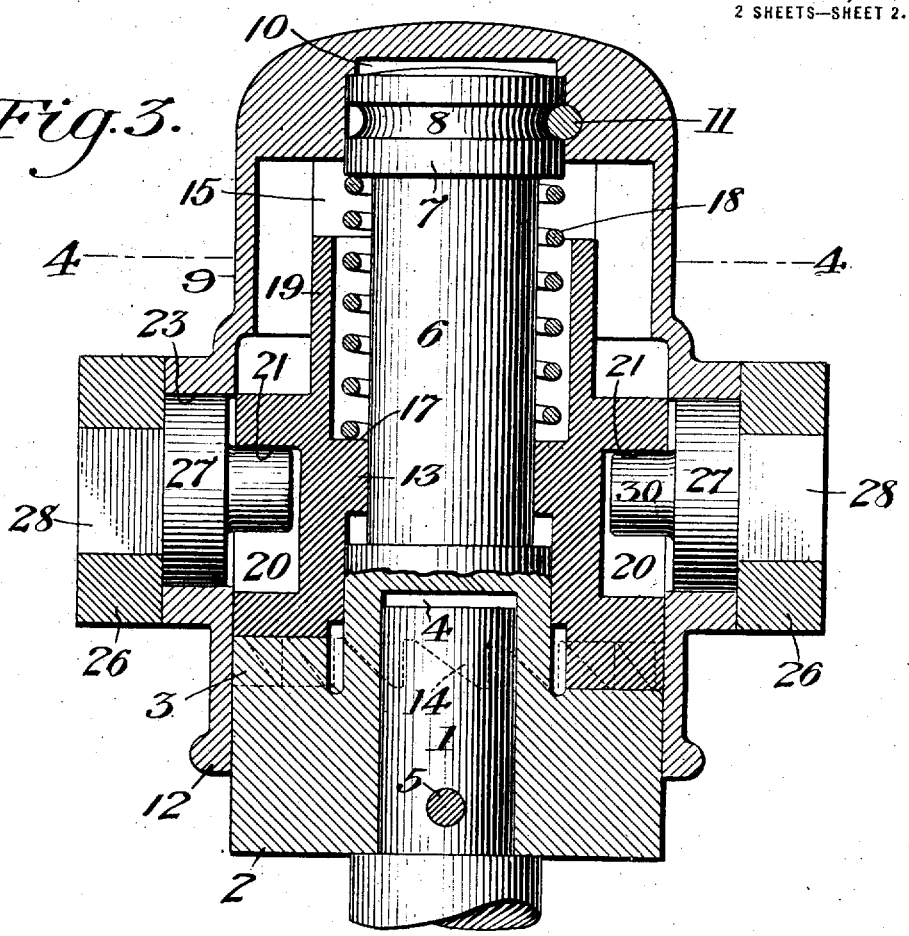
Figure 4:
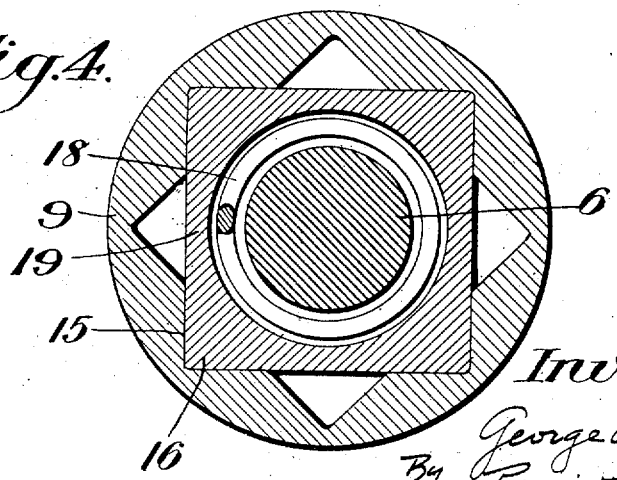

Figure 1 is a side elevation. Fig. 2 is a plan. Fig. 3 is a vertical section, and Fig. 4 is a cross-section on the line 4—4 of Fig. 3.

Referring to the drawings:—1 represents the end of the brake rod. Associated with this rod are the usual ratchet wheel and pivoted dog which are not shown inasmuch as they are elements commonly employed. Secured to the brake rod is a clutch member 2 the upper edge of which is provided with a circular row of clutch teeth 3. This clutch member connects with the brake rod by the formation therein of a socket 4 into which the end of the rod extends, the member being then fixed to the rod by a cross-pin 5. Extending upwardly from the clutch member 2 and preferably integral therewith is a central post 6. This post is in line with the brake rod and may be considered substantially a continuation of the rod. Arranged upon the upper end of this post is a collar 7 having formed therein an annular groove 8. Mounted upon the post is a chambered casing 9. This casing is secured to the post in a manner whereby it may rotate but without endwise displacement. For this purpose the head of the casing is provided on the interior with a socket or opening 10 into which the end of the post and collar thereon extend, the casing being then secured by means of a key 11 which passes through the head of the casing and is contained to lie in part within the annular recess 8 formed in the collar as aforesaid. By this means of attachment the casing is mounted to rotate but held fixedly as against endwise displacement.

The casing 6 extends downwardly and the bottom end 12 thereof fits snugly around the outer surface of the clutch member 2, thereby closing the interior of the casing. Arranged within the casing and around the post 6 is a movable clutch member 13. Upon the bottom edge thereof this member is provided with an annular row of clutch teeth 14 by which the two clutch members may coöperate to have operative engagement with one another in the usual manner. For this purpose the movable clutch member has both a rotary and endwise movement, a rotary movement in order that it may be rotated or turned to have an intermittent engagement with the fixed clutch member 2 and a sliding endwise movement not only to secure this effect but also to enable its being raised into a disengaging position with relation to the member 2 and adjacent parts. The movable clutch member rotates with the rotary casing 9 and is also mounted to slide endwise therein. For this purpose the interior of the casing is provided with channels or angular grooves 15 in which the movable clutch member is mounted to slide, the same being squared or otherwise angularly formed by parts 16 so as to fit and slide longitudinally within grooves 15 of the casing.

On the interior thereof the movable clutch member is provided with an annular flange or edge 17 which fits around the post 6. Between this flange or edge and the collar 7 on the top end of the post is arranged a compression spring 18 the tension of which operates to hold the movable clutch member in a normal engaging position. The spring 18 is coiled around the post and is otherwise retained by an annular extension 19 to the movable clutch member providing a housing for the spring. Upon the exterior thereof the movable clutch member 13 is provided with an annular socket or opening 20 presenting a top annular edge or shoulder 21. Formed in the diametrically opposite sides of the casing 9 are sockets or openings 23. These openings are adjacent the opening 20 in the movable clutch member 13 and provide bearings in the casing for the ends of the drop lever 24. The drop lever 24 comprises a handle 25 from which extend forked arms 26 around the opposite sides of the casing and carrying upon their respective ends circular butts 27 socketed to turn within the openings 23 of the casing. Attachment is secured between the arms 26 and these butts by squared heads 28 projecting from the outer faces of the respective butts and with which the respective arms 26 connect. Projecting from the inner faces of each of the respective butts are studs 30 eccentrically arranged with relation to the center of the butts 27 and which project into the opening 20 in the movable clutch member beneath its top edge or shoulder 21. Thus supported upon the casing 9, the drop lever may be turned from a position where its handle projects outwardly with a substantially horizontal projection at right angles to the axis of the casing and movable clutch member, to a dropped position where the handle will lie substantially parallel with said axis and also the brake rod as is customary in such types of levers. In this connection it is to be observed that the arms 26 of the lever are preferably bent arms in order that the lever may be dropped without interference with the casing.

The disposition and arrangement of the operating parts of the lever, especially with reference to the studs 30, which form practically parts of the lever, are such that when the lever is occupying its out-turned position, the studs 30 will be contained to lie in the opening 20 of the movable clutch member just below the edge 21 thereof without engagement with this edge. When, however, the lever is dropped these studs owing to the eccentricity thereof and operating essentially as arms to the lever, will engage the edge 21 of the movable clutch member and lift this member into a disengaging position with relation to the member 2, the spring 18 being then compressed and the movable clutch member sliding within the casing.

The further operation of the parts is as follows: The respective clutch members cooperate with one another for turning the brake rod and setting up the brake in the usual manner, the movable member having an intermittent forward and reverse rotary movement engaging the teeth of its complementary member during the forward movement thereof and riding backwardly over the same for a fresh grip upon the reverse movement thereof. The rotation of the movable clutch member for setting up the brake is obtained through the rotation of the casing 9 by the lever when in its out-turned or horizontal position. During this operation the studs 30 carried by the lever will occupy positions out of engagement with the edge 21 of the movable clutch member, permitting this member to have proper freedom to operate. When, however, the lever is dropped it will fulcrum upon the casing and the studs 30 thereof operating as lifting fingers or arms of the lever, will engage the edge 21 of the movable clutch member and by their bearing against this edge will lift the movable clutch member into a disengaging position with relation to its complementary member and maintain it in such disengaging position as long as the lever is maintained in a dropped position.

What I claim is:

1. In a brake handle, the combination of a clutch mechanism comprising opposing clutch members each having a plurality of teeth and one of which is movable to have engagement with the other or into a disengaging position with relation thereto, a rotatable member rotatable with said movable clutch member, and a drop lever pivotally mounted upon said rotatable member to fulcrum thereon, and having engagement with said movable clutch member for positively lifting the same into a disengaging position with relation to said other clutch member upon the dropping of said lever.

2. In a brake handle, the combination of a rotary member, a clutch mechanism comprising opposing annular ratchets, one of which rotates with said rotary member and may engage with the other, said first-named ratchet being movable also into a disengaging position with relation to said other ratchet, and a drop lever secured to said rotary member for rotating the same and said movable ratchet as said lever is turned, said lever being pivotally mounted upon said rotary member to fulcrum thereon and engaging said movable clutch member and moving the same into a disengaging position upon the dropping of said lever.

3. In a brake mechanism, the combination of a rotary member, a staff supporting said member, a clutch mechanism comprising opposing clutch members, one of which, a crown ratchet, rotates with said rotary member to have engagement with the other of said clutch members, said crown ratchet being movable also axially of said staff into a position of disengagement with relation to said other clutch member and a brake lever pivotally mounted upon said rotary member to turn thereon and occupy either an out-turned position or a downturned position, said lever having a part engaging said crown ratchet and maintaining the same in a disengaging position when said lever is occupying its downturned position.

4. In a brake handle, the combination of an exterior member, means for supporting said member to rotate without endwise displacement, a clutch mechanism comprising opposing clutch members of which one is a movable member rotatable with said exterior rotary member to have engagement with the other of said clutch members, said movable clutch member being also displaceable into a disengaging position with relation to said other of the clutch members, and a lever pivotally mounted upon said exterior rotary member for rotating the same and said movable clutch member as said lever is turned, said lever having also an operative engagement with said movable clutch member for lifting the same into a disengaging position upon the pivotal turning of said lever on said exterior rotary member.

5. In a brake handle, the combination of a clutch mechanism comprising opposing clutch members one of which members is an annular ratchet movable rotarily to have engagement with the other of said members or into a disengaging position with relation thereto, a rotary casing rotatable with said movable clutch member, and a drop lever pivotally mounted upon said casing for rotating the same and said movable clutch member as said lever is turned laterally said lever being adapted also to have engagement with said movable clutch member and move the same into a disengaging position away from said other clutch member upon the dropping of said lever.

6. In a brake handle, the combination of an exterior rotatable member, means for supporting said member to rotate without endwise displacement, a clutch mechanism comprising opposing clutch members, one a movable clutch member rotatable with said exterior rotary member to have a changeable engagement with the other of said clutch members, said movable clutch member being slidable longitudinally within said exterior rotary member into a disengaging position with relation to said other clutch member, said movable clutch member presenting also an exterior edge, and a lever pivotally mounted upon said exterior rotary member for rotating the same and said movable clutch member, said lever being adapted also to have engagement with said edge for lifting said movable clutch member into a disengaging position upon the dropping of said lever.

7. In a brake handle, the combination of a rotary casing, means for supporting said casing, a clutch mechanism comprising opposing clutch members, one a movable clutch member rotatable with said casing and slidable therein, and a drop lever secured to said casing for rotating the same and said movable clutch member, said lever being adapted to engage said movable clutch member and lift the same upon the dropping of said lever.

8. In a brake handle, the combination of a rotary exterior casing, means for supporting said casing to rotate without endwise displacement, a clutch mechanism comprising opposing clutch members, one a movable clutch member coöperating with the other of said members to have operative engagement therewith or be movable away from the same to a disengaging position, said movable clutch member being rotatable with said casing and slidable endwise with relation thereto, means for holding said movable clutch member in normal engagement with said member, and a lever pivotally mounted upon said casing for moving the same and said movable clutch member, said lever being adapted also to engage said movable clutch member and lift the same into a disengaging position upon the dropping of said lever.

9. In a brake handle, the combination of a rotary casing, means for supporting said casing, a clutch mechanism comprising opposing clutch members, one a movable member coöperating with the other of said clutch members to have operative engagement therewith or be movable away from the same into a disengaging position, said movable clutch member being rotatable with said casing and slidable endwise with relation thereto, and a lever having a handle and forked arms mounted to turn within the opposite sides of said casing and presenting parts adapted to have engagement with said movable clutch member for lifting the same into a disengaging position upon the dropping of said lever.

10. In a brake handle, the combination of a rotary casing, means for supporting said casing, a clutch mechanism comprising annular clutch members, one a movable member coöperating with the other of said clutch members to have operative engagement therewith or be movable away from the same into a disengaging position, said movable clutch member being rotatable with said casing and slidable endwise with relation thereto, and a lever having forked arms with butts on the ends thereof turning within the opposite sides of said casing with members eccentrically arranged thereon to engage said movable clutch member upon the dropping of said lever substantially as described.

11. In a brake handle, the combination of a central post, a casing, means for mounting said casing upon said post to rotate thereon without endwise displacement, a clutch mechanism comprising opposing clutch members, one a movable clutch member rotatable with said casing and slidable therein into a disengaging position with relation to the other of said clutch members, and a drop lever secured to said casing for rotating the same and said movable clutch member, said lever being adapted also to engage said movable clutch member and lift the same into a disengaging position upon the dropping of said lever.

In testimony whereof I affix my signature.

GEORGE A. WEBSTER.